W. PRICE.
Plows.

No. 137,716.            Patented April 8, 1873.

Witnesses.
W. R. Singleton
W. H. Chandler

Inventor
Whitman Price

AM. PHOTO-LITHOGRAPHIC CO. N.Y. (OSBORNE'S PROCESS.)

UNITED STATES PATENT OFFICE.

WHITMAN PRICE, OF MOUNT OLIVE, NORTH CAROLINA.

IMPROVEMENT IN PLOWS.

Specification forming part of Letters Patent No. 137,716, dated April 8, 1873; application filed September 25, 1872.

*To all whom it may concern:*

Be it known that I, WHITMAN PRICE, of Mount Olive, in the county of Wayne and State of North Carolina, have invented certain new and useful Improvements in Plows; and I do hereby declare that the following is a full, clear, and exact description thereof, that will enable others skilled in the art to which it appertains to make and use the same, reference being had to the accompanying drawing and to the letters of reference marked thereon which form a part of this specification.

Figure 1:
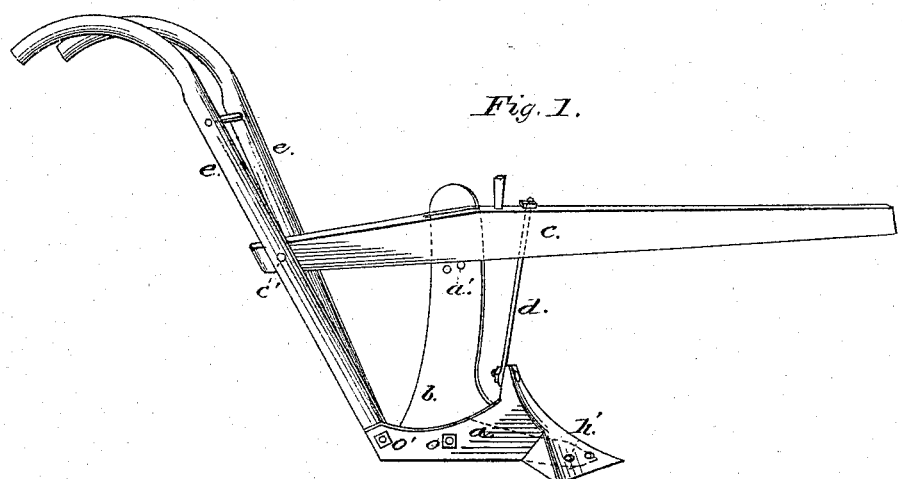
Figure 2:
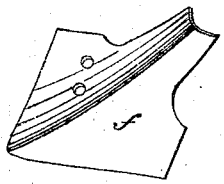
Figure 3:
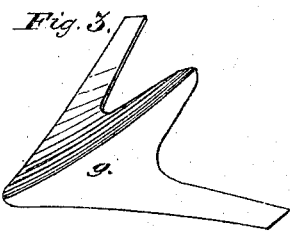
Figure 6:
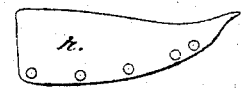
Figure 7:
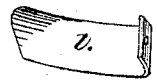
Figure 4:
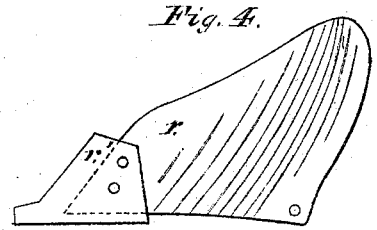
Figure 5:
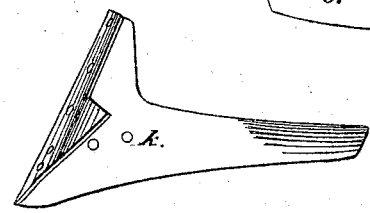
Figure 8:
Figure 9:
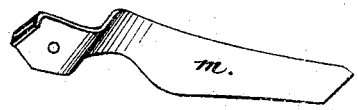

Figure 1 is an elevation, in perspective, of the plow as it appears before the devices for special work are applied. Figs. 2 and 3 show different forms of points which are attached when it is designed to be used as a shovel-plow. Fig. 4 shows the mold-board with point attached, by the attachment of which to the land-side it forms the implement in ordinary use as a turning-plow. Figs. 5 and 6 are pieces which are secured to the land-side and form the plow in use for passing between the rows of corn, cotton, or other similar farm productions, and is technically called a jack. Fig. 9 is a shave, secured to the land-side in the rear of the jack, by which arrangement the tool may be used as a cotton-shave. Figs. 7 and 8 are knives or scrapers, secured to opposite sides of the land-side in the rear of Fig. 2; the tool then becomes what is termed a cotton-shave.

This invention relates to that class of plows which are capable of being changed to suit the different operations necessary to be carried on in the cultivation of corn, cotton, potatoes, and all other farm crops which are planted in rows or hills, at a sufficient distance apart to admit of cultivation by the labor of animals; and it has for its object to reduce the cost of such implements, as well as increasing the facility of operating them, by rendering the parts easy of adjustment when it is desired to change from one description of work to another; and it consists in the general construction and arrangement of parts, as is hereinafter fully described.

The part $a$, Fig. 1, which performs the duty of the land-side in ordinary plows, and may receive the same name in this, is formed with a longitudinal opening for the insertion of the standard $b$ and handles $e\ e$, which are secured therein by the bolts $o$ and $o'$. The front part is enlarged, spreading out so as to form a firm seat for the differently-formed implements which are to be secured to it. It is also pierced with two holes, $h'$, through which are passed the two bolts which firmly secure to it the variously-formed mold-boards and points; but they are still further secured by a hook or lock, which enters the recess in the land-side shown in dotted lines. The standard $b$ is of wood. This material is used for a twofold purpose: First, as it gives great stiffness with little weight, is easily replaced when worn out or broken; secondly, by occupying the vacant space immediately in the rear of the front or cutting edge of the plow it improves the working of the implement, as this space is liable, in clay soils when the ordinary metallic standard is used, to be filled with earth, causing the tool to become much heavier, and consequently more fatiguing to the operator. This standard is secured to the land-side by being inserted in the opening therein, and the screw-bolt $o$ passed through a suitable orifice in each. Its upper end is pierced with a series of holes, through one of which a pin, $a'$, is inserted. Changing the position of this pin changes the gage or depth to which the plow will run. The beam $c$ is of ordinary construction, being secured at its rear extremity by a rod passing through it and the handles at $c'$, and having a mortise, as shown in dotted lines, through which the standard $b$ passes. The beam thus rests upon the pin $a'$, and is firmly bound to the land-side by the iron rod $d$, which is attached to the upwardly-projecting front of the land-side, and passes thence upward, in front of the standard, through a hole in the beam, as shown by the dotted lines, and is provided at its upper end with a screw and nut. It will be seen that to vary the depth to which the plow will run it is only necessary to loosen the nut upon the upper end of the rod $d$, place the pin $a'$ in the desired hole in the standard and tighten the nut again, thus changing the gage as may be desirable. The handles $e\ e$ are of wood, and are both secured at the bottom to the land-side by a single bolt, $o'$, and to the beam by the rod $c'$. They are still further strengthened by a cross-brace connecting them above the beam, as shown.

The double points $f$ and $g$, Figs. 2 and 3, are modifications of those used when the implement is to be used as a shovel-plow, and they are secured to the land-side $a$ by two bolts passing through the holes $h'$, and a projection which enters a recess in the opposite side of the land-side. The mold-board $r$, Fig. 4, has a point, $r'$, secured to it by the same bolts passing through it and the projection of the land-side. This modification of the instrument performs the duties of the common plow in the preliminary operations of preparing the land for the reception of seed.

The devices represented by letters $k$ and $h$, Figs. 5 and 6, are attached by first securing the piece $k$ to the land-side by two bolts passing through the holes $h'$, and through corresponding ones in the part to be attached, the piece $h$ being then secured to $k$ by screws passing through corresponding orifices in each piece, the whole, when properly arranged, forming a plow commonly called a jack, which may be run close to the rows or hills with great facility, cutting up and pulverizing the earth between them.

In connection with this arrangement, the shave $m$, Fig. 9, may be secured to the land-side by bolt $o$, and so set as to cut deeper than the jack or point $k$, thus cutting off the roots of grass or weeds and pulverizing the soil to a greater depth than could be conveniently done by the jack alone.

The two blades $l$ and $l'$, Figs. 7 and 8, may be secured upon opposite sides of the land-side by the bolt $o$ passing through the orifice in their curved ends. They thus form, in connection with the points $b$ or $g$, an implement somewhat similar to that last described, and for a similar purpose, but with this important difference, while that is intended for running close to the rows, thus throwing the earth from them, this passes through the center between the rows, stirring the earth and throwing it toward the rows.

It will be seen that the implement above described is capable of plowing the ground, preparing it for the reception of the seed, and performing all the necessary operations of after culture in itself and in a perfect manner, thus saving much expense in the purchase and care of various tools for performing the same operations, and is peculiarly adapted to the present wants of the southern States, the large plantations having been divided, in many cases, into small farms, cultivated by freedmen, whose working teams consist of one, or at most two, mules, and who cannot afford to purchase the costly plows and cultivators heretofore used, or the teams which would be required to operate them.

I am aware that plows have been constructed with interchangeable parts, as shown in the patents of John Hanes, July 23, 1865, and N. Z. Glenn, January 23, 1872; therefore do not claim such construction, simply; but What I do claim is—

The plow provided with the wooden standard, and having its various parts constructed and arranged in combination therewith, as herein shown and described.

In testimony that I claim the foregoing I have hereunto set my hand.

WHITMAN PRICE.

Witnesses:
 WM. R. SINGLETON,
 M. K. CHANDLER.